United States Patent Office 3,431,259
Patented Mar. 4, 1969

3,431,259
7-PHENYLACETAMIDOCEPHALOSPORANIC ACID DERIVATIVES
Kiyoshi Hattori, Ibaraki, and Sueo Atarashi, Kyoto, Japan, assignors to Fujisawa Pharmaceutical Co., Ltd., Osaka, Japan, a company of Japan
No Drawing. Filed Jan. 18, 1967, Ser. No. 610,024
Claims priority, application Japan, Jan. 22, 1966, 41/3,794
U.S. Cl. 260—243
Int. Cl. C07d 93/08; A61k 27/00
6 Claims

ABSTRACT OF THE DISCLOSURE

Antibacterial cephalosporin compounds: morpholino- or N-mono-(or N,N-di-) substituted piperazinodithiocarboxylated derivatives of 7-(halo-and/or nitrophenyl) acetamido cephalosporanic acids and their preparations.

BACKGROUND OF THE INVENTION

Field of the invention

This invention pertains to chemistry, hetrocyclic carbon compounds.

Description of the prior art

There is United States Patent No. 3,239,516 patented Mar. 8, 1966.

Summary of the invention

This invention relates to novel 7-phenylacetamidocephalosporanic acid derivatives and to methods for their preparation and use.

The 7-phenylacetamidocephalosporanic acid derivatives of this invention may be represented by the following Formula I:

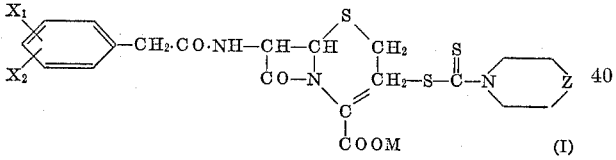

wherein $X_1$ is a hydrogen or halogen atom; $X_2$ is a halogen atom or a nitro group; Z is an oxygen atom or the group,

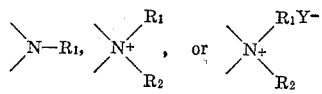

in which $R_1$ is a lower alkyl, lower hydroxylkyl or benzyl group, $R_2$ is a lower alkyl group, and Y is a residue of a mineral acid; and M is a hydrogen atom or an alkali metal, or an anionic charge when Z is

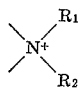

As used herein and hereinafter, the term "lower" is intended to mean the group containing from one to six carbon atoms and the term "halogen" is intended to mean chlorine, bromine, and fluorine iodine. Besides, the term "a residue of a mineral acid" refers to $Cl^-$, $Br^-$, $I$, $NO_3^-$, $SO_4^-$ and the like.

Description of preferred embodiments

Though many derivatives of cephalosporin compounds have been developed hereto, the inventors found that the compounds of this invention represented in the above Formula I are an excellent antibacterial agent possessing characteristics as follows:

(1) The compounds exhibit a noticeably high antibacterial activity against gram positive bacteria and also a powerful antibacterial activity against penicillin-resistant and sensitive *Staphylococcus aureus*.

(2) The antibacterial activity is scarcely influenced in the presence of serum and is scarcely reduced in the presence of rat tissue homogenates.

(3) The oral mouse tests revealed the compounds to have a powerful protection effect against gram positive bacteria as penicillin-resistant and sensitive *Staphylococcus aureus*, *Diplococcus pneumoniae* or *Streptococcus hemolyticus*.

(4) Highly maintained at blood level by parenteral administration.

(5) Exceedingly low in toxicity.

(6) Favourably absorbed by the oral administration.

Description of the preferred embodiment

The compounds (I) of this invention may be prepared by reacting 7-phenylacetamidocephalosporanic acids having the Formula II

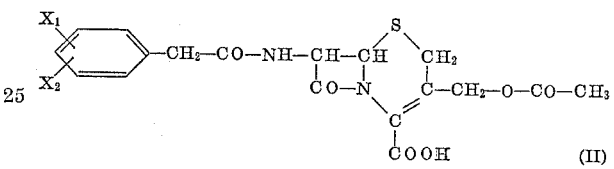

wherein $X_1$ and $X_2$ mean the same as defined before, or salts thereof, with morpholino- or N-monosubstituted piperazino-dithiocarboxylates and, if needed, reacting the resultant with a N-alkylating agent in case of being the N-monosubstituted piperazino-dithiocarboxylic acid derivatives of 7-phenylacetamidocephalosporanic acids and then treating the corresponding N,N-disubstituted compounds thereof with a mineral acid.

As used in the above Formula I and II, specific examples of the group,

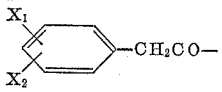

are 2-chlorophenylacetyl, 3-chlorophenylacetyl, 4-chlorophenylacetyl, 2-bromophenylacetyl, 3-bromophenylacetyl, 4 - bromophenylacetyl, 4-iodophenylacetyl, 2,3-dichlorophenylacetyl, 2,4 - dichlorophenylacetyl, 2,5 - dichlorophenylacetyl, 2,6 - dichlorophenylacetyl, 3,4 - dichlorophenylacetyl, 2-nitrophenylacetyl, 3-nitrophenylacetyl, 4-nitrophenylacetyl, 2-chloro-3-nitrophenylacetyl, 2-nitro-3 - chlorophenylacetyl, 2 - chloro - 4-nitrophenylacetyl, 2-chloro-6-nitrophenylacetyl, 3 - nitro-4-chlorophenylacetyl, 2-nitro-5-chlorophenylacetyl and the like.

Examples of salts of 7-phenylacetamidocephalosporanic acids to be used in the above reaction are the inorganic salts such as sodium, potassium, ammonium salt or the like, and the organic salts such as triethylammonium, dicyclohexylammonium salt or the like. Also, examples of morpholino- or N-monosubstituted piperazinodithiocarboxylates are the sodium, potassium or ammonium salts of morpholino-dithiocarboxylic acid or of N-monosubstituted piperazino-dithiocarboxylic acid in which the substituents of the piperazine part are exemplified with methyl, ethyl, propyl, butyl, pentyl, hexyl, hydroxymethyl, hydroxyethyl, hydroxypropyl, benzyl and the like.

The reaction of 7-phenylacetamidocephalosporanic acids or salts thereof, with morpholino- or N-monosubstituted piperazino-dithiocarboxylates is usually carried out in a solvent. Among the solvents may be mentioned water, chloroform, nitrobenzene, formamide, dimethylformamide, methanol, ethanol, dimethylsulfoxide, acetone and other organic solvents inert in this reaction. The high polar solvent such as water or formamide may be preferably employed in this invention. In addition, the hydrophilic solvents may be used with water. Also the reaction is preferably carried out under a weak alkaline to acidic condition. When using the free acids of 7-phenylacetamidocephalosporanic acids (II) as a starting material, it is desirable to carry out the reaction in the presence of a base such as, for instance, alkali metal hydroxide, alkali metal hydrogen carbonate or trialklyamine. The reaction temperture is not particularly limited, but preferably under warming.

Among the compounds obtained by the above mentioned reaction, the N-monosubstituted piperazino-dithiocarboxylic acid derivatives of 7-phenylacetamidocephalosporanic acids may be converted to the corresponding N,N-disubstituted compounds by the treatment with a N-alkylating agent. The suitable N-alkylating agents may be lower alkyl bromide or iodide such as methyl iodide, ethyl bromide, ethyl iodide, propyl iodide, butyl iodide or the like, and lower dialkylsulfate such as dimethylsulfate. The N-alkylating reaction is usually carried out in a solvent such as chloroform, formamide or the like, among which most preferable one may be formamide. Further, the N,N-disubstituted compounds may be converted to the corresponding salts with a mineral acid. The suitable mineral acids may be hydrochloric acid, hydrobromic acid, nitric acid, sulfuric acid and the like.

As an alternative method, the compounds (I) of this invention may be obtained by acylating 7-amino-3-(substituted thiocarbonylthiomethyl)-3-cephem - 4 - carboxylic acids or salts thereof with appropriate reactive derivatives of substituted phenylacetic acids.

For instance, 7-(3-chlorophenyl)acetamido-3-(4-methylpiperazino - 1 - thiocarbonylthiomethyl) - 3 - cephem-4-carboxylic acid may be obtained by treating 7-amino-3- (4 - methylpiperazino - 1 - thiocarbonylthiomethyl) - 3-cephem-4-carboxylic acid with 3-chlorophenylacetyl chloride.

The produced object compounds of this invention may be separated and collected according to conventional methods known in the art.

All the procedures of this invention are preferably carried out under a mild condition because of a comparative instability of the cephalosporin compounds.

Biological and clinical test results of the representative compounds of this invention are illustrated as below.

(I) BIOLOGICAL AND CLINICAL TESTS (1) Antibacterial spectrum

Minimum inhibitory concentration against various kinds of gram positive and negative bacteria determined by the usual agar serial dilution method is shown as in Table 1.

Compound D.—Sodium 7-(3-chlorophenyl)acetamido-3-(4 - methylpiperazino-1-thiocarbonylthiomethyl)-3-cephem-4-carboxylate.

Compound E.—Sodium 7-(3-bromophenyl)acetamido-3 - (4 - methylpiperazino-1-thiocarbonylthiomethyl)-3-cephem-4-carboxylate.

Compound F.—Sodium 7-(3-chlorophenyl)acetamido-3 - (morpholino-1-thiocarbonylthiomethyl)-3-cephem-4-carboxylate.

The abbreviation hereinafter referred to as "Compound (A) or (B)" will be employed as the same significance.

(2) Activity against *Staphylococcus aureus* isolated from the patient

Distribution of antibacterial titer was measured with respect to 200 strains of *Staphylococcus aureus* isolated from the patent.

About 70 percent of the test strains (143 out of the 200 strains) were highly penicillin-resistant strains that their growth could not be inhibited by penicillin at 100 U./ml. However, the compound (A) inhibited the growth of all strains at concentrations below 12.5 mcg./ml., greater parts of the strains (70%) at concentrations below 3.13 mcg./ml., and 46% of the strains at concentration of 0.19 mcg./ml., respectively.

(3) Influence of serum on antibacterial activtity

Normal rabbit serum, 10%, 25% and 50%, was respectively added to the test media, which were inoculated with *Staphyloccoccus aureus* 209–P at 37° C. for 20 hours, and thereafter the bacterial growth was examined. The minimum inhibitory concentrations are given in the following table. As to the test media, agar was used for 10% serum added media and meat extract bouillon was used for 25% and 50% serum added media.

TABLE II

| Compound | Control | Serum addition (mcg./ml.) | | |
|---|---|---|---|---|
| | | 10% | 25% | 50% |
| A | 0.05 | 0.1 | 0.1 | 0.1 |
| B | .025 | 0.05 | 0.2 | 0.2 |

(4) Protective effect against infections (i) The $ED_{50}$ value of the compound (A) orally given in mice infected with *Diplococcus pneumoniae* was about ⅕ that of 5-methyl-3-(2-chlorophenyl)isoxazolylpenicillin and about half that of α-aminobenzylpenicillin.

The $ED_{50}$ value of the compound (A) orally given in mice infected with *Streptococcus hemolyticus* was about ¼ that of 5-methyl-3-(2-chlorophenyl)isoxazolylpenicillin, and nearly the same as that of α-aminobenzylpenicillin.

(ii) In mice infected with *Staphylococcus aureus*

TABLE 1

| Organisms | Compound (mcg./ml.) | | | | | |
|---|---|---|---|---|---|---|
| | A | B | C | D | E | F |
| Staphylococcus aureus Newman | 0.05 | 0.05 | 0.05 | 0.1 | 0.1 | 0.1 |
| Staphylococcus aureus Terashima | 0.1 | 0.05 | 0.05 | 0.1 | 0.1 | 0.1 |
| Staphylococcus aureus Smith | 0.025 | 0.0125 | 0.0125 | 0.025 | 0.025 | 0.05 |
| Staphylococcus aureus 209-P | 0.025 | 0.025 | 0.05 | 0.05 | 0.05 | 0.05 |
| Bacillus subtilis ATCC 6633 | 0.025 | 0.025 | 0.025 | 0.025 | 0.1 | 0.025 |
| Bacillus subtilis PCI-219 | 0.025 | 0.025 | 0.025 | | | |
| Diplococcus pneumoniae III | 0.05 | 0.025 | 0.0125 | 0.1 | 0.1 | 0.1 |
| Streptococcus hemolyticus S-23 | 0.0125 | 0.025 | 0.00625 | 0.025 | 0.05 | 0.05 |
| Sarcina lutea PCI-1001 | 0.0125 | 0.0125 | 0.0125 | 0.0125 | 0.0125 | 0.0125 |
| Escherichia coli NIHJ | 2.5 | 2.5 | 2.5 | 1.25-2.5 | 1.25 | 5.0 |

Compound A.—4-[[7-(3 - chlorophenyl)acetamido-4-carboxy - 3 - cephem-3-yl]methylthiothiocarbonyl]-1,1-dimethylpiperazinium hydroxide inner salt.

Compound B.—4-[[7 - (3 - bromophenyl)acetamido-4-carboxy - 3 - cephem-3-yl]methylthiothiocarbonyl]1,1-dimethylpiperazinium hydroxide inner salt.

Compound C.—4 - [[7-(3,4-dichlorophenyl)acetamido-4 - carboxy-3-cephem-3-yl]-methylthiothiocarbonyl]-1,1-dimethylpiperazinium hydroxide inner salt.

(Smith and Newman), the curative effect of the compound (A) by oral administration was nearly the same as that of cephaloridine by subcutaneous administration.

A high activity of the compound (A) was also shown against infections with strains resistant to α-aminobenzylpenicillin.

As a result of the test using clinically isolated *Staphylococcus aureus* (No. 43) as a test organism, the curative rate was 100% with the compound (A) 3 mg. given in mice orally and about 70% with 0.75 mg. given in mice orally, respectively. In this experiment, the test organism was cultured on the slant of brain-heart infusion with 10% rabbit serum added and then incubated at 37° C. for 20 hours (the viable cell counts $2-3 \times 10^8$ cells/ml). To this bacterial suspension was added 5% gastric mucin in equal volume and the intestinal cavity of dd-strain mice was inoculated with 0.5 ml. of the mixed solution. The experimental mice consisted of 7 animals per group.

(iii) In mice infected with *Staphylococcus aureus* (Newman and Smith) and *Diplococcus pneumoniae*, the curative effect of the compound (A) by subcutaneous administration was superior to or substantially the same as that of cephaloridine.

(5) Absorption and excretion (i) The compound (A) suspension was orally given in rabbits in doses of 100 mg./kg. and in dogs in doses of 20 mg./kg., and the concentrations of the antibiotic substance in the serum and urine were determined.

In the experiment with rabbits, the maximum blood concentration was achieved 3 hours after administration, the mean value of the concentration being 1.7 mcg./ml. The rate of the substance wholly excreted in 24 hours corresponded to 7–8% of the administered volume, equally in rabbits and dogs.

(ii) The compound (A) suspension and cephaloridine solution were intramuscularly given in rats in doses of 20 mg./kg. respectively. The concentrations in serum of the compound (A) were superior to that of cephaloridine as shown in Table III.

TABLE III

|  | Concentration in serum (mcg./ml.) | | |
| --- | --- | --- | --- |
|  | 30 min. | 1 hr. | 2 hr. |
| Compound A | 29.0 | 24.0 | 7.7 |
| Cephaloridine | 13.2 | 4.0 | 0.28 |

(6) Acute toxicity in mice

In the animals receiving the compound (A) orally, no death occurred even by the administration of 8,000 mg./kg. The $LD_{50}$ value following the subcutaneous administration was at more than 8,000 mg./kg. and that following intraperitoneal injection was at 1,326 mg./kg.

(7) Clinical test

Clinical study on human beings of the compound (A) was carried out for 12 patients suffering from various diseases of bronchial pneumonia, bronichial asthma, bronchitis, pneumonia, acute tonsillitis, bacterial endocarditis or abscess of hip, by orally administering 2 g. a day for 4 to 18 days. The curative effect was found in 11 patients.

(II) DOSAGE

The optimum daily dosage for adults of the cephalosporin compounds of this invention is about 250–3000 mg. and the optimum dosage unit about 125–750 mg. These dosages, however, depend on the condition, body weight, etc. of the patient and also on the oral or parenteral route of administration.

For oral route, two or three tablets or capsules, one of each containing 250 mg. of the cephalosporin compound is administered to adult patients at once, and two or three times daily. And for parenteral route, one or two of an injection containing 125 mg. of the cephalosporin compound is administered at once, and two or four times daily.

(III) COMPOSITION

The cephalosporin compounds of this invention may be administered to human subjects by any suitable route, e.g. oral or parenteral route. Compositons administered by oral route may be dispensible powder, granule, tablet and capsule, but most convenient one may be capsule.

Also, the suitable forms of compositions for parenteral use may be an injectable solution or suspension. An injectable suspension will desirably be prepared for some of the cephalosporin compounds which are less soluble in water. In this case, the cephalosporin compound is finely pulverized and then suspended in an aqueous solution containing one or more of a dispersing agent (as carboxymethylcellulose, methylcellulose or polyvinyl pyrrolidone), a surface active agents (as Tween 20 or Tween 80), an antiseptic (as methylparabene or propylparabene) or a stabilizer (as sodium citrate or sodium chloride). A suitable suspension may contain 1–2% of the dispersing agent, 0.1–0.5% of the surface active agent, 0.2–0.5% of the antiseptic, and 1–2% of the stabilizer.

The main indications for the cephalosporin compounds of this invention are for the infections caused by gram positive bacteria including penicillin-resistant and sensitive Staphylococci, e.g. pneumonia, bronchial pneumonia, bronchitis, acute bronichitis, tonsillitis, laryngitis, bacterial endocarditis, wound and skin infections, otitis media, abscess, myocarditis and the like.

In the following examples there are described several preferred embodiments of illustrate the invention. However, it should be understood that the invention is not intended to be limited to the specific embodiments.

Example 1

Sodium 7 - (3 - chlorophenyl)acetamido-3-(4-methylpiperazino - 1 - thiocarbonylthiomethyl)-3-cephem-4-carboxylate and 4 - [[7 - (3 - chlorophenyl)acetamido-4-carboxy - 3 - cephem - 3-yl]-methylthiothiocarbonyl]-1,1-dimethylpiperazinium hydroxide inner salt.

(a) A solution of 1000 mg. of sodium 7-(3-chlorophenyl) - acetamidocephalosporanate and 700 mg. of sodium 4 - methyl - piperazino - 1 - dithiocarboxylate (1½ $H_2O$) in 25 ml. of 15% formamide aqueous solution was warmed at 70° C. for two and a half hours with stirring, then cooled up to room temperature and extracted with 30 ml. of chloroform after addition of 35 ml. of a saturated aqueous solution of sodium chloride. The resulting chloroform layer was fractioned and further extracted with 10 ml. of chloroform and it was washed two times with 15 ml. of 50% saturated sodium chloride solution, then dried over sodium sulfate and concentrated at less than 40° C. up to about 5 ml. under reduced pressure. Then, hereto added 32 ml. of ether, the resulting precipitate was collected by filtration, washed with ether and dried to give sodium 7-(3-chlorophenyl)acetamido - 3 - (4 - methylpiperazino - 1 - thiocarbonylthiomethyl)-3-cephem-4-carboxylate having a melting point of 161–162° C. (decomposed). (Yield: 86.0%).

Ultraviolet absorption spectrum $\lambda_{max.}^{H_2O}$ 272 m$\mu$, $E_{1\ cm.}^{1\%}$ 334

A solution of 400 mg. of above prepared material, in 8 ml. of formamide, hereto added 152 mg. of methyl iodide, was allowed to stand for one and a half hours. There was then provided the precipitate by adding 2.4 ml. of acetone and warming in a water bath at 45° C. for one hour with stirring, and it was filtered by suction after cooling, and washed with 5 ml. of a mixture of tetrahydrofuran and methanol in the ration of (2:1), then with 1 ml. of acetone and 0.5 ml. of ether to give 236 mg. of 4-[[7-(3-chlorophenyl)acetamido-4-carboxy-3 - cephem - 3 - yl]methylthiothiocarbonyl] - 1,1 - dimethylpiperazinum hydroxide inner salt having a melting point of 176° C. (decomposed).

Ultraviolet absorption spectrum $\lambda_{max.}^{80\%\ tetrahydrafuran}$ 275 m$\mu$, $E_{1\ cm.}^{1\%}$ 384

Calculated for $C_{23}H_{27}N_4O_4S_3Cl \cdot \frac{1}{2}H_2O$: C, 48.90; H, 4.96; N, 9.93; S, 17.0; Cl. 6.29. Found: C, 48.91; H, 5.28; N, 9.86; S, 16.89; Cl. 6.60.

(b) A solution of sodium 7-(3-chlorophenyl)acetamidocephalosporanate, produced from 4,250 mg. of 7-(3-chlorophenyl)acetamidocephalosporanic acid, in 70 ml. of water, then hereto added 2,200 mg. of sodium 4 - methylpiperazino - 1 - dithiocarboxylate ($2H_2O$) was warmed at 40° C. for 24 hours with stirring at times and cooled after addition of 110 ml. of a saturated aqueous solution of sodium chloride. The resulting oily precipitate was dissolved in 150 ml. of chloroform and washed six times with 30 ml. of a mixture of the saturated sodium chloride aqueous solution and water in the ratio of (1:1). The chloroform layer was dried over sodium sulfate and concentrated under reduced pressure. Then, ether was added to the residual solution and the precipitate collected by filtration to give 2,690 mg. of sodium 7-(3-chlorophenyl)acetamido-3-(4-methylpiperazino - 1 - thiocarbonylthiomethyl) - 3 - cephem - 4 - carboxylate having a melting point of 161–162° C. (decomposed).

Further, a solution of 1,000 mg. of the above produced material in 20 ml. of chloroform, hereto added 2 ml. of the chloroform solution containing 300 mg. of methyl iodide, was allowed to stand at room temperature for 3 days with stirring at times. The resulting precipitate was collected by filtration, washed four times with 5 ml. of water, then dissolved in 10 ml. of a mixed solution of dimethylformamide and water and, hereto added 200 ml. of tetrahydrofuran, allowed to stand in a cold place to give the precipitate. The precipitate was collected by centrifugation (10,000 r.p.m.) and washed with either to give 4 - [[7 - (3 - chlorophenyl)acetamido-4-carboxy-3-cephem - 3 - yl] - methylthiothiocarbonyl]-1,1-dimethylpiperadinium hydroxide inner salt.

Example 2

4 - [[7 - (3 - chlorophenyl)acetamido - 4 - carboxy - 3-cephem - 3 - yl]methylthiothiocarbonyl] - 1,1 - dimethylpiperazinium chloride.

A suspension of 1,665 mg. of the material above prepared in 30 ml. of water was stirred and hereto added 0.3 ml. of 10 N hydrochloric acid to give the clear solution. The resulting solution was concentrated in vacuo and, hereto added 99% ethanol, further concentrated in vacuo to give 1.5 g. of 4-[[7-(3-chlorophenyl)acetamido-4 - carboxy - 3-yl]-methylthiothiocarbonyl]-1,1-dimethylpiperazinium chloride.

Example 3

Sodium 7-(3,4-dichlorophenyl)acetamido-3-(4-methylpiperazino - 1 - thiocarbonylthiomethyl) - 3 - cephem - 4-carboxylate and 4-[[7-(3,4-dichlorophenyl)acetamido-4-carboxy - 3-cephem-3-yl]-methylthiothiocarbonyl] - 1,1-dimethylpiperazinium hydroxide inner salt.

A solution of 2.0 g. of 7-(3,4-dichlorophenyl)acetamidocephalosporanic acid and 550 mg. of sodium hydrogen carbonate in 50 ml. of water, hereto added 5 ml. of an aqueous solution containing 1.5 g. of sodium 4-methylpiperazino-1-dithiocarboxylate, was warmed at 65° C. for two hours, then cooled up to room temperature and extracted three times with 100 ml. of chloroform after addition of 50 ml. of a saturated aqueous solution of sodium chloride. The resulting chloroform layer was separated, then washed two times with 40 ml. of the saturated sodium chloride solution and dried over sodium sulfate. Chloroform was removed in vacuo, the resulting residue washed with ether and recrystallized from tetrahydrofuran to yield 1,300 mg. of sodium 7-(3,4-dichlorophenyl)acetamido - 3 - (4 - methylpiperazino - 1 - thiocarbonylthiomethyl)-3 - cephem-4-carboxylate having a melting point of 210–212° C. (decomposed).
Ultraviolet absorption spectrum $\lambda_{max.}^{phosphate\ buffer\ (pH\ 6.4)}$ 273 m$\mu$, $E_{1\ cm.}^{1\%}$ 309

A solution of 600 mg. of the above produced material in 10 ml. of formamide, hereto added 350 mg. of methyl iodide, was allowed to stand for one and a half hours and 20 ml. of acetone was added to give the precipitate. The precipitate was collected by filtration, and washed with acetone, then with water and with acetone in turn to give 350 mg. of 4-[[7-(3,4-dichlorophenyl)acetamido-4-carboxy - 3 - cephem - 3 - yl] - methylthiothiocarbonyl]-1,1-dimethylpiperazinium hydroxide inner salt having a melting point of 182–183° C. (decomposed).
Ultraviolet absorption spectrum $\lambda_{max.}^{phosphate\ buffer\ (pH\ 6.4)}$ 273 m$\mu$, $E_{1\ cm.}^{1\%}$ 394

Example 4

Sodium 7 - (3 - bromophenyl)acetamido-3-(4-methylpiperazino - 1 - thiocarbonylthiomethyl) - 3 - cephem - 4-carboxylate and 4-[[7 - (3 - bromophenyl)-acetamido-4-carboxy - 3 - cephem - 3 - yl] - methylthiothiocarbonyl]-1,1-dimethylpiperazinium hydroxide inner salt.

A solution of sodium 7 - (3 - bromophenyl)acetamidocephalosporanate, prepared from 3,000 mg. of 7-(3-bromophenyl)acetamidocephalosporanic acid, in 95 ml. of water, then hereto added 1,500 mg. of sodium 4-methylpiperazino - 1 - dithiocarboxylate ($2H_2O$), was warmed at 40° C. for 24 hours with stirring and cooled after addition of 100 ml. of a saturated aqueous solution of sodium chloride to give the oily precipitate. Then, it was filtered, dissolved in about 100 ml. of chloroform and washed four times with 40 ml. of a mixture solution of a saturated sodium chloride aqueous solution and water in the raito of (1:1). The resulting chloroform layer was fractioned, dried over magnesium sulfate and concentrated under reduced pressure. The residue was filtered to give sodium 7-(3-bromophenyl)acetamido-3-(4 - methylpiperazino - 1 - thiocarbonylthiomethyl) - 3-cephem-4-carboxylate having a melting point of 155–158° C. (decomposed).
Ultraviolet absorption spectrum $\lambda_{max.}^{H_2O}$ 270 m$\mu$, $E_{1\ cm.}^{1\%}$ 269

A mixture solution of 1,000 mg. of the above prepared material in 15 ml. of chloroform, then hereto added 3 ml. of the chloroform solution containing 270 mg. of methyl iodide was allowed to stand for 48 hours with stirring at times to give the precipitate. Then it was filtered, dried and washed with 10 ml. of water and further two times with 3 ml. of water. The washing may be also employed to give the object compound. The resulting precipitate was dissolved in a mixed solution of 3 ml. of dimethylformamide and water, diluted with tetrahydrofuran to fill up to 100 ml., and then collected by centrifugation to give 270 mg. of 4-[[7-(3-bromophenyl)acetamido-4-carboxy - 3 - cephem - 3 - yl] - methylthiothiocarbonyl]-1,1-dimethylpiperazinium hydroxide inner salt having a melting point of 175–176° C. (decomposed).

Further, to the above washing, water was added to fill up to about 100 ml. to give a viscous precipitate, and it was filtered and dissolved in above mixed solution of dimethylformamide and water, and then 40 ml. of tetrahydrofuran was added to give the precipitate.

The resulting precipitate was collected by centrifugation to give 124 mg. of the same object compound.
(Yield: 394 mg.)
Ultraviolet absorption spectrum $\lambda_{max.}^{C_2H_5OH:H_2O=4:1}$ 273 m$\mu$, $E_{1\ cm.}^{1\%}$ 288

Example 5

Sodium 7 - (3-chlorophenyl)acetamido-3-[4-2-hydroxyethyl)piperazino - 1 - thiocarbonylthiomethyl]-3-cephem-4-carboxylate.

A solution of 2,230 mg. of sodium 7-(3-chlorophenyl) acetamidocephalosporanate in 100 ml. of water, then hereto added 1,280 mg. of sodium 4-(2-hydroxyethyl) piperazino-1-dithiocarboxylate (1½ $H_2O$), was allowed to stand at 40° C. for 24 hours after addition of 100 ml. of a saturated aqueous solution of sodium chloride to give the gel-like precipitate. Then it was collected by centrifugation, dried under reduced pressure and dissolved in methanol. And the resulting precipitate was filtered after addition of ether to give 1,330 mg. of sodium 7-(3-chlorophenyl) - acetamido - 3 - [4 - (2 - hydroxyethyl) - piperazino - 1 - thiocarbonylthiomethyl] - 3 - cephem - 4 - carboxylate.

Ultraviolet absorption spectrum $$\lambda_{max.}^{H_2O}\ 271\ m\mu,\ E_{1\,cm.}^{1\%}\ 292$$

Example 6

Sodium 7-(4-chlorophenyl)acetamido-3-[4-(2-hydroxyethyl)piperazino - 1 - thiocarbonylthiomethyl]-3-cephem-4-carboxylate.

A solution of 1,300 mg. of 7-(4-chlorophenyl)acetamido-cephalosporanic acid and 250 mg. of sodium hydrogen carbonate in 25 ml. of water, hereto added 850 mg. of sodium 4-(2-hydroxyethyl)-piperazino-1-dithiocarboxylate, was stirred at room temperature to give a clear solution. The resulting clear solution was adjusted to pH 8.4 and warmed at 55° C. for 7 hours with stirring. A mixed solution of 20 ml. of chloroform and 25 ml. of a saturated aqueous solution of sodium chloride was added to precipitate a viscous oil in a water layer.

Then it was collected by filtration from the resulting water layer and dissolved in 30 ml. of dimethylformamide. The solution was divided into two parts: the same quantity of acetone was added to one part of the solution to precipitate a faint yellowish white crystal.

It was collected by filtration to give 256 mg. of sodium 7 - (4 - chlorophenyl)acetamido-3-[4-(2 - hydroxyethyl) piperazino - 1 - thiocarbonylthiomethyl]-3-cephem-4-carboxylate having a melting point of 215–217° C. (decomposed). And to the other part of the solution, 100 ml. of tetrahydrofuran and then 150 ml. of ethyl acetate was added to give 500 mg. of the object compound. Further, the above ethyl acetate filtrate was diluted with 100 ml. of ethyl acetate to give the precipitate. (Yield: 1,074 mg.).

Ultraviolet absorption spectrum $$\lambda_{max.}^{80\%\ tetrahydrofuran}\ 276\ m\mu,\ E_{1\,cm.}^{1\%}\ 336$$

Example 7

Sodium 7 - (4 - chlorophenyl)acetamido-3-(4-methylpiperazino - 1 - thiocarbonylthiomethyl)-3-cephem-4-carboxylate.

A solution of 2.0 g. of 7-(4-chlorophenyl)acetamidocephalosporanic acid, 300 mg. of sodium hydrogen carbonate and 12 g. of sodium 4-methylpiperazino-1-dithiocarboxylate (1½ H₂O) in 50 ml. of a buffer solution of pH 6.5 was stirred at 70° C. for one and a half hours, and extracted two times with 50 ml. of chloroform after addition of 50 ml. of a saturated aqueous solution of sodium chloride. The chloroform layer was fractioned, washed with 20 ml. of 50% saturated aqueous solution of sodium chloride and dried over sodium sulfate. Then chloroform was removed and the resulting residue was dissolved in ether to precipitate the crystal. The crystal was collected by filtration to give 1.0 g. of sodium 7-(4-chlorophenyl)acetamido - 3 - (4-methylpiperazino-1-thiocarbonylthiomethyl)-3-cephem-4-carboxylate.

Ultraviolet absorption spectrum $$\lambda_{max.}^{H_2O}\ 275\ m\mu,\ E_{1\,cm.}^{1\%}\ 315$$

Example 8

Sodium 7 - (2-nitrophenyl)acetamido-3-(4-methylpiperazino-1-thiocarbonylthiomethyl)-3-cephem-4-carboxylate.

A mixture of 1.0 g. of 7-(2-nitrophenyl)acetamido-cephalosporanic acid and 200 mg. of sodium hydrogen carbonate was dissolved in a mixed solution of acetone and water in the ratio of (1:1), hereto was added 520 mg. of sodium 4-methylpiperazino-1-dithiocarboxylate, and warmed at 60° C. for five hours. Acetone was removed in vacuo and a saturated aqueous solution of sodium chloride added to the residue to give the precipitate. The resulting precipitate was extracted with chloroform and the fractioned chloroform layer washed four times with 50% saturated aqueous solution of sodium chloride and dried over sodium sulfate. From the chloroform extract, chloroform was removed and ether added to the residue to give the precipitate. The resulting precipitate was collected by filtration, dissolved in tetrahydrofuran, then concentrated and the crystal collected by filtration to give 440 mg. of sodium 7-(2-nitrophenyl)acetamido - 3 - (4-methylpiperazino-1-thiocarbonylthiomethyl) 3-cephem-4-carboxylate.

Ultraviolet absorption spectrum $$\lambda_{max.}^{20\%\ tetrahydrofuran}\ 270\ m\mu,\ E_{1\,cm.}^{1\%}\ 410$$

EXAMPLE 9

Sodium 7 - (4-chlorophenyl)acetamido-3-(morpholino-4-thiocarbonylthiomethyl)-3-cephem-4-carboxylate.

A solution of 2.0 g. of 7-(4-chlorophenyl)acetamido-cephalosporanic acid and 400 mg. of sodium hydrogen carbonate in 60 ml. of a buffer solution of pH 6.5, hereto added 1.0 g. of sodium morpholino-4-dithiocarboxylate (2 H₂O), was warmed at 70° C. for one hour with stirring to give the gel-like precipitate. Then, it was collected by filtration, washed with water and collected to give 900 mg. of 7 - (4-chlorophenyl)acetamido-3-(morpholino-4-thiocarbonylthiomethyl)-3-cephem-4-carboxylate having a melting point of 201–203° C.

EXAMPLE 10

Sodium 7 - (3-chlorophenyl)acetamido-3-(morpholino-4-thiocarbonylthiomethyl)-3-cephem-4-carboxylate.

A solution of sodium 7-(3-chlorophenyl)acetamido-cephalosporanate, produced from 1,500 mg. of 7-(3-chlorophenyl)acetamidocephalosporanic acid, in 30 ml. of water, hereto added 5 ml. of an aqueous solution containing 820 mg. of sodium morpholino-4-dithiocarboxylate, was warmed at 40° C. for 24 hours with stirring and cooled to give the precipitate. It was then collected by centrifugation (15,000 r.p.m.), washed with water and dried to give 1,000 mg. of sodium 7-(3-chlorophenyl)acetamido - 3 - (morpholino - 4 - thiocarbonylthiomethyl)-3-cephem-4-carboxylate having a melting point of 219–221° C. (decomposed).

Further, to the supernatant of the centrifugalized solution was added 35 ml. of a saturated sodium chloride solution to give the precipitate, and it was collected by centrifugation to give 124 mg. of the object compound. (Yield: 1,224 mg.)

Ultraviolet absorption spectrum $$\lambda_{max.}^{tetrahydrofuran:\ H_2O=12:1_3}\ 275\ m\mu,\ E_{1\,cm.}^{1\%}\ 317$$

EXAMPLE 11

Sodium 7 - (3 - chlorophenyl)acetamido-3-(4-benzylpiperazino - 1 - thiocarbonylthiomethyl)-3-cephem-4-carboxylate.

A solution of sodium 7-(3-chlorophenyl)acetamido-cephalosporanate, produced from 1,170 mg. of 7-(3-chlorophenyl)acetamidocephalosporanic acid, in 25 ml. of water, hereto added 980 mg. of sodium 4-benzylpiperazino-1-dithiocarboxylate, was warmed at 40° C. for 24 hours with stirring, and cooled after adding 25 ml. of a saturated aqueous solution of sodium chloride to give a viscous substance. Then it was collected by filtration, dissolved in 40 ml. of chloroform and washed four times with 30 ml. of a mixture solution of the saturated sodium chloride aqueous solution and water in the ratio of (1:1). The chloroform layer was fractioned, dried over sodium sulfate and concentrated under reduced pressure. To the residue was added ether to give 660 mg. of sodium 7-(3-chlorophenyl)acetamido - 3 - (4-benzylpiperazino-1-thiocarbonylthiomethyl) - 3 - cephem-4-carboxylate having a melting point of 137–140° C. (decomposed).

Ultraviolet absorption spectrum $\lambda_{max.}^{tetrahydrofuran: H_2O=12:13}$ 276 m$\mu$, $E_{1 cm.}^{1\%}$ 288

EXAMPLE 12

Sodium 7 - (3,4-dichlorophenyl)acetamido-3-(4-benzyl-piperazino - 1 - thiocarbonylthiomethyl)-3-cephem-4-carboxylate.

A solution of sodium 7-(3,4-dichlorophenyl)acetamidocephalosporanate, produced from 1,270 mg. of 7-(3,4-dichlorophenyl)acetamidocephalosporanic acid, in 25 ml. of water, hereto added 3 ml. of an aqueous solution containing 980 mg. of sodium 4-benzylpiperazino-1-dithiocarboxylate, was treated under Example 10 to give 1,037 mg. of sodium 7-(3,4-dichlorophenyl)acetamido-3-(4-benzyl-piperazino - 1 - thiocarbonylthiomethyl)-3-cephem-4-carboxylate having a melting point of 144–147° C. (decomposed).

Ultraviolet absorption spectrum $\lambda_{max.}^{tetrahydrofuran: H_2O=12:31}$ 273 m$\mu$, $E_{1 cm.}^{1\%}$ 186

We claim:
1. A compound of the formula:

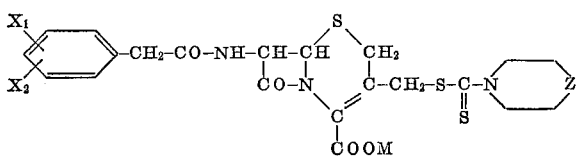

wherein $X_1$ is a hydrogen or halogen atom; $X_2$ is a halogen atom or a nitro group; Z is an oxygen atom or the group,

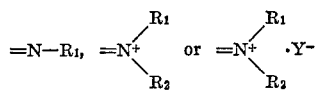

is a lower alkyl, lower hydroxyalkyl or benzyl group, $R_2$ is a lower alkyl group and Y is an anion of a mineral acid; and M is a hydrogen atom, an alkali metal, or an anionic charge when Z is the group,

2. A compound in accordance with claim 1, in which the group,

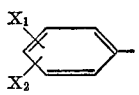

is 3-chlorophenyl radical and the group,

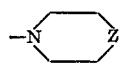

is 4,4-dimethylpiperazino radical, named as 4-[[7-(3-chlorophenyl)acetamido - 4 - carboxy - 3 - cephem-3-yl]-methylthiothiocarbonyl] - 1,1 - dimethylpiperazinium hydroxide inner salt.

3. A compound in accordance with claim 1, in which the group,

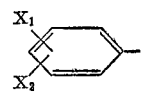

is 3-bromophenyl radical and the group,

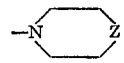

is 4,4-dimethylpiperazino radical, named as 4-[[7-(3-bromophenyl)acetamido - 4 - carboxy-3-cephem-3-yl]-methylthiothiocarbonyl]-1,1-dimethylpiperazinium hydroxide inner salt.

4. A compound in accordance with claim 1, in which the group,

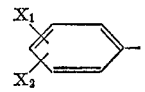

is 3,4-dichlorophenyl radical and the group,

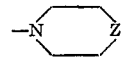

is 4,4-dimethylpiperazino radical, named as 4-[[7-(3,4-dichlorophenyl)acetamido - 4 - carboxy-3-cephem-3-yl]-methylthiothiocarbonyl] - 1,1 - dimethylpiperazinium hydroxide inner salt.

5. A compound in accordance with claim 1, in which the group,

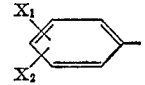

is 3-chlorophenyl radical, the group,

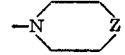

is 4-methylpiperazino radical and M is a sodium atom, named as sodium 7 - (3 - chlorophenyl)acetamido-3-(4-methylpiperazino - 1 - thiocarbonylthiomethyl)-3-cephem-4-carboxylate.

6. A compound in accordance with claim 1 in which the group,

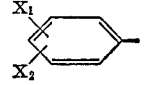

is 3-chlorophenyl radical, the group,

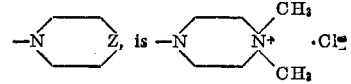

and M is a hydrogen atom, named as 4-[[7-(3-chlorophenyl)acetamido - 4 - carboxy-3-cephem-3-yl]-methylthiothiocarbonyl]-1,1-dimethylpiperazinium chloride.

References Cited
UNITED STATES PATENTS
3,239,516   3/1966   Heyningen et al. _____ 260—243

NICHOLAS S. RIZZO, Primary Examiner.

U.S. Cl. X.R.
424—246